S. SKIBA.
COVER FOR VESSELS.
APPLICATION FILED MAR. 31, 1911.

1,002,004.

Patented Aug. 29, 1911.

WITNESSES
S. Birnbaum
E. Geduldiger

INVENTOR
Stephen Skiba
BY
Sigmund Herzog
his ATTORNEY

UNITED STATES PATENT OFFICE.

STEPHEN SKIBA, OF NEW YORK, N. Y.

COVER FOR VESSELS.

1,002,004. Specification of Letters Patent. Patented Aug. 29, 1911.

Application filed March 31, 1911. Serial No. 618,194.

*To all whom it may concern:*

Be it known that I, STEPHEN SKIBA, a subject of the King of Hungary, and resident of the city of New York, in the county of New York and State of New York, have invented certain new and useful Improvements in Covers for Vessels, of which the following is a specification.

The present invention relates to an improved cover for vessels, by means of which the boiling over of milk or other liquids is prevented.

One of the objects of the invention is to provide a cover of this character which is so simple in construction as not to be beyond the reasonable cost of such an article, or in other words which can be manufactured on a commercial scale.

With these and other objects in view, which will appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1:
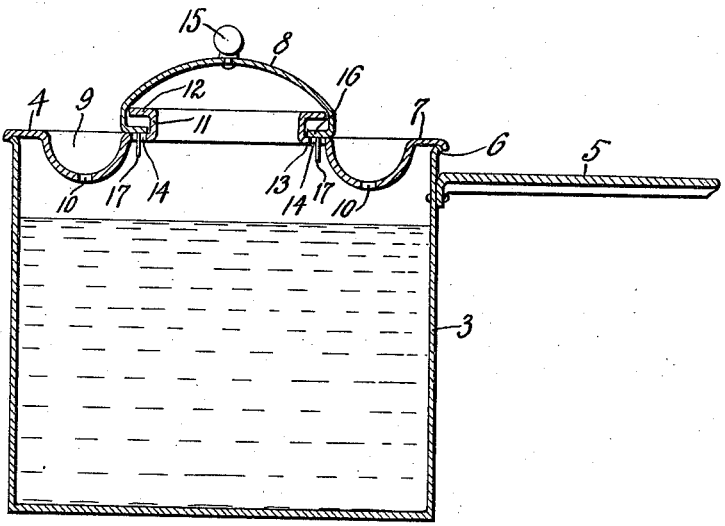
Figure 2:
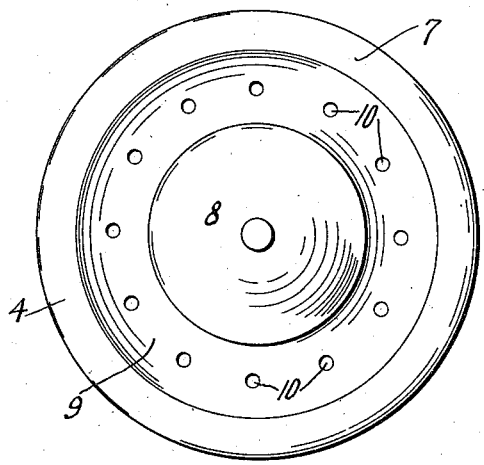

Figure 1 is a vertical central section of a vessel with the improved cover in position thereon, and Fig. 2 is a plan view of the cover.

In the drawings, the numeral 3 indicates a vessel, and 4 the cover of the same. The vessel may be of any desired size, shape and material, and is usually provided with a handle 5 for the well known purpose. The vessel shown in the drawings is cylindrical, and provided at its upper edge with a rim 6, which forms a seat for the cover.

The cover 4 is made of two sections, that is sections 7 and 8. The section 7 comprises a ring shaped body, having an annular depression 9, which has in its lowermost level perforations 10, 10. At its inner edge the section 7 is provided with a vertical, cylindrical extension 11, which merges into an outwardly extending flange 12. The horizontal portion 13 of the cover, which is adjacent to the cylindrical extension 11, is provided with perforations 14, and forms a seat for the section 8 of the cover, which latter is dome-shaped, and has a knob 15 attached thereto. At its inner edge this section is provided with an inwardly extending horizontal flange 16, which may be made integral therewith or attached thereto in any suitable manner. This horizontal flange is arranged between the horizontal seat 13 and the flange 12 of the cover section 7, and carries thereon a plurality of downwardly projecting pins 17, which engage the perforations 14 in the cover section 7.

The operation of the device is as follows: When milk is boiled in the vessel to the boiling point, usually a skin is formed on the surface of the same, which closes the perforations 10 in the cover as it rises toward the top of the vessel. After the perforations 10 have been closed, a further rise of the pressure in the vessel will lift the section 8 of the cover, the vapor being then permitted to pass through the perforations 14 so as to destroy the skin on the boiling liquid, after which the liquid will pass through the perforations 14 into the depression 9, and thence back, through the perforations 10, into the vessel. The cover section 8 returns then to its normal position. The movement of the section 8 of the cover is guided by the cylindrical portion 11 and the flange 12 of the cover section 7 and also by the pins 17, which engage the perforations 14.

It will be observed that the cover section 8 forms, in fact, a valve which is attached to the cover section 7, so that it cannot be mislaid or lost.

What I claim is:

1. In a cover for vessels, the combination with a ring shaped body having an annular depression provided with a series of perforations in its bottom, said ring shaped body being provided with an upwardly and an outwardly extending flange at its inner edge and with a horizontal seat below the outwardly extending portion of said flange, said horizontal seat having a plurality of perforations extending therethrough, of a dome shaped body having an inwardly extending flange normally resting upon said horizontal seat and closing thereby the perforations in said seat, the outwardly extending portion of the flange of said ring-shaped body being arranged above said seat a distance to allow vertical play for said dome-shaped body and the inner diameter of the inwardly extending flange of said dome shaped body being somewhat larger than the outer diameter of the upwardly extending portion of the flange of said ring shaped body.

2. In a cover for vessels, the combination with a ring shaped body having an annular depression provided with a series of perforations in its bottom, said ring shaped body being provided with an upwardly and an outwardly extending flange at its inner edge and with a horizontal seat below the outwardly extending portion of said flange, said horizontal seat having a plurality of perforations extending therethrough, of a dome shaped body having an inwardly extending flange normally resting upon said horizontal seat and closing thereby the perforations in said seat, the outwardly extending portion of the flange of said ring-shaped body being arranged above said seat a distance to allow vertical play for said dome-shaped body and the inner diameter of the inwardly extending flange of said dome shaped body being somewhat larger than the outer diameter of the upwardly extending portion of the flange of said ring shaped body, a plurality of downwardly projecting pins fastened to said dome shaped body and engaging the perforations in said horizontal seat, and a knob attached to said dome shaped body.

Signed at New York, in the county of New York and State of New York, this 11th day of February, A. D. 1911.

STEPHEN SKIBA.

Witnesses:
EDUARD THOMKA,
MŎTYÁS MORÁNSKY.

---

Copies of this patent may be obtained for five cents each, by addressing the "Commissioner of Patents, Washington, D. C."